Nov. 26, 1963    L. PÉRAS    3,112,141
FLEXIBLE BEARINGS
Filed Oct. 30, 1961    2 Sheets-Sheet 1

Inventor
Lucien Peras
By Stevens, Davis, Miller & Mosher
Attorneys

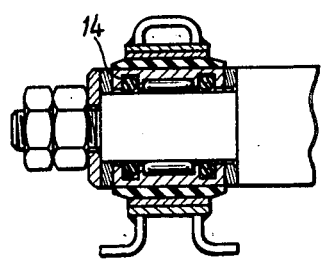
FIG. 3
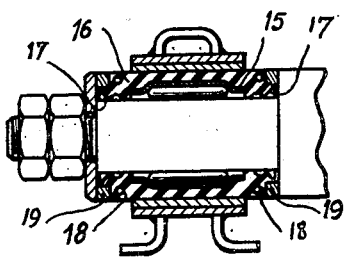
FIG. 4
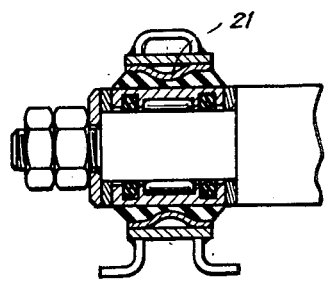
FIG. 6
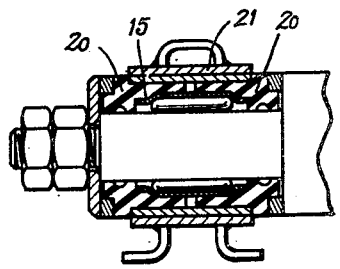
FIG. 5
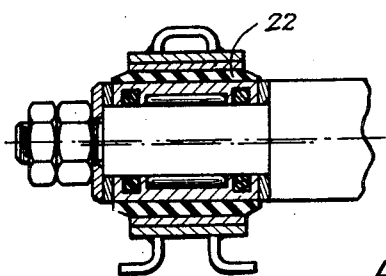
FIG. 7
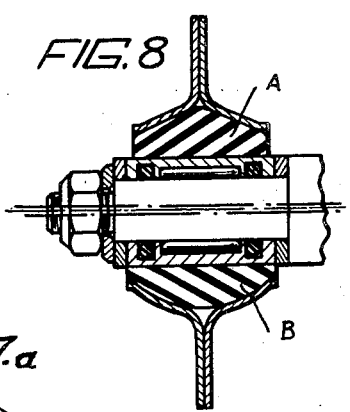
FIG. 8
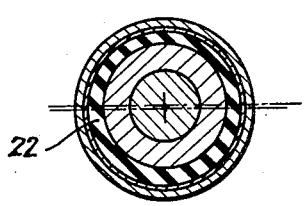
FIG. 7.a United States Patent Office 3,112,141
Patented Nov. 26, 1963

3,112,141
FLEXIBLE BEARINGS
Lucien Péras, Billancourt, France, assignor to Regie Nationale des Usines Renault, Billancourt, France
Filed Oct. 30, 1961, Ser. No. 148,450
Claims priority, application France Dec. 29, 1960
1 Claim. (Cl. 308—184)

This invention relates to improvements in flexible or resilient bearings of the type comprising an elastic bush interposed between the journal and bearing members, as currently used in automobiles.

The joints or swivels of wheel suspension arms, retaining rods, etc. are generally rubber-mounted. However, high-flexibility vehicle suspension systems suffer both from the stiffness inherent in elastic joints and from the friction set up in plain-bearing joints. Automobile manufacturers have thus been led to revert to conventional but more expensive devices such as self-lubricating bearings, ball-bearings, roller-bearings, tapered roller-bearings, needle-bearings, etc.

It is the essential object of this invention to provide a flexible bearing consisting of the combination of a resilient bush with a needle bearing race or shell disposed internally of and solid with said bush, as so to combine the advantages characteristic of resilient bearings with those of needle bearings. In other words:

The assembly comprises in general a resilient bearing including a pair of concentric tubular members assembled by a rubber bush, the inner tubular member receiving therein a shell-mounted or race-forming set of needles.

Thus, the size of the rubber lining may be reduced considerably in comparison with conventional bearings of same load capacity.

In describing the invention, reference will be made hereinafter to the accompanying drawings in which.

Figure 1A:
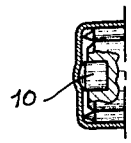
FIGURE 1a shows an embodiment of FIGURE 1.
Figure 1:
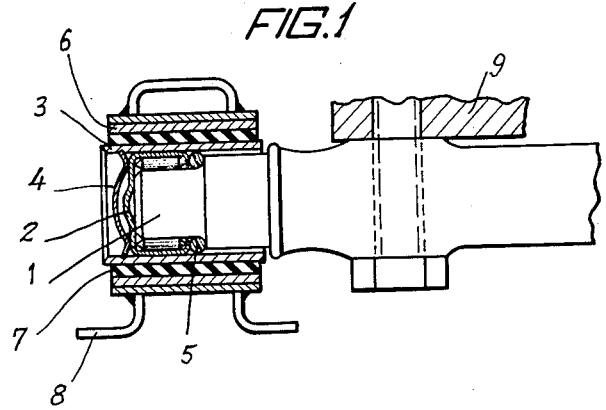
FIGURE 1 is a section taken on a plane passing through a flexible pivot shaft.
Figure 2:
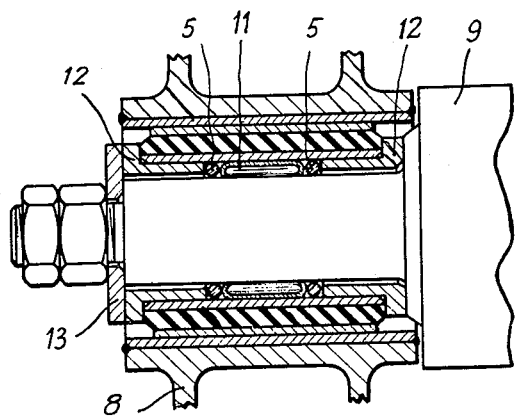

FIGURE 2 shows a variation of FIGURE 1 with a needle shell provided at both ends, FIGURE 3 shows an arrangement with an internal tubular member of the flexible bearing that replaces the race of the needles, FIGURE 4 shows a needle shell integral with the flexible bearing, FIGURE 5 is a modification of the embodiment of FIGURE 4 provided with two molded rubber members, FIGURE 6 shows a modification wherein the exterior tube is deformed in order to ensure greater freedom in spherical rotation, FIGURES 7 and 7a show the assembly of FIGURE 3 with the flexible bearing eccentric in free condition, and FIGURE 8 shows a modification with the flexible bearing being biconical or spherical.

Referring first to FIG. 1, the flexible bearing illustrated comprises:

A journal 1 on which a needle shell or race 2 is mounted, this shell being force-fitted in the inner tubular member 3 of a resilient bearing. A retainer 4 is provided for holding the needle shell against axial movement, and the assembly is sealed by the provision of a packing ring 5. The resiliency of the joint results from the elastic bearing consisting of two concentric tubular members 3, 6 interconnected by a rubber lining 7; the assembly comprising the needle bearing and the rubber bush is force-fitted for example in a wheel suspension arm or in a lever 8, according to requirements. The journal 1 is secured on a frame, chassis or like structure 9.

If desired, the device may be held against axial movement by causing the outer end of journal or shaft 1 to pivot on the bottom of the needle shell. A ball or like friction element 10 may be inserted in the end face of the shaft for pivotal engagement with the bottom surface of the needle shell (see FIG. 1a).

It may be noted that the tightness of the assembly may be completed by causing the inner tubular member of the resilient bush to overlap the journal or shaft 1 with the minimum radial play.

FIG. 2 illustrates a different disposal comprising a set of needles 11 enclosed in a shell of substantially tubular configuration which is open at either ends. In this case, two packings 5 are provided for sealing the assembly.

The assembly may be held against axial movement, for example by using nuts. An axial play is reserved to avoid any undue clamping of the bearing. A pair of distance-pieces 12 force-fitted in the inner tubular member of the resilient bearing are provided for positioning the set of needles in the axial direction, an end friction washer 13 being in frictional engagement with the outer distance-piece, as shown.

As in the preceding case, flexible bearings of this type may advantageously be mounted symmetrically on the two journals of a suspension arm and ensure the requisite longitudinal positioning due to the opposition of the two abutments.

The alternate embodiment proposed in FIG. 3 departs from the preceding ones in that the inner tubular member 14 of the resilient bearing is hardened through a suitable heat treatment and replaces the outer race of the needle bearing. In addition, this inner tubular member is formed with recesses for the packing rings.

FIG. 4 illustrates a case-hardened needle race 15 having adequately shaped end portions, which is embedded in the resilient material of the elastic bush 16. The needle bearing is sealed at either end by a packing-forming portion of the rubber bush, as shown. The twin-lip seals 17 are shown by way of example only, since other shapes may suit the purpose contemplated.

On the other hand, circlips 18 may be embedded by moulding as in conventional packings.

A pair of friction rings 19 cemented or not on the rubber or like elastic material permit the frictional engagement between the rotary members.

FIG. 5 illustrates an alternate embodiment of the disposal shown in FIG. 4. In this case, two rubber moulded elements 20 may be forced from opposite ends both over the needle race 15 and in the outer tubular member 21.

FIG. 6 illustrates an alternate embodiment wherein the outer tubular member 21 is formed with an inwardly pressed shallow central groove in order to increase the amplitude of swivelling movement of the bearing while reducing its possibility of radial movement.

This mounting is particularly useful when a swivelling movement is necessary while keeping the shaft misalignment to the lowest possible value.

FIGURES 7 and 7a illustrate the mounting of FIG. 3 (by way of example) but with a resilient bearing 22 somewhat eccentric in the free condition so that the assembly can be perfectly concentric under a normal load of known intensity and direction. Of course, the bearing must be properly set when fitting same on its supporting members.

FIG. 8 illustrates a modified embodiment of a resilient bearing wherein the elastic bush is substantially biconical (A) or substantially part spherical (B).

The needle flexible bearing according to this invention is characterized by the following advantages:

(a) Due to the needle bearing:
An improved efficiency affording a greater sensitiveness of movement (of suspension);
A better resistance to wear and tear;
Reduced over-all dimensions.

(b) Due to the elastic bush:
The body or frame is isolated from shocks and vibration;
Noiseless operation;

It permits spherical or swivelling movements for properly aligning the needles, in spite of geometrical inaccuracies that may arise in the mounting of suspension systems of automobiles.

(c) It constitutes an assembly having the smallest possible dimensions, that is:

A needle bearing permitting a swivelling movement, which is self sealing, held against axial movement and lubricated for all its useful life.

Of course, various modifications may be brought to the different embodiments shown and described herein by way of example, without however departing from the spirit and scope of the invention as set forth in the appended claim.

I claim:

In combination, a fixed shaft disposed within a housing and carried by a frame, a peripheral shoulder disposed adjacent the end of said shaft, a set of needle bearings in a shell forming its outer race disposed around said shaft and in rolling contact therewith, said set of needle bearings being disposed on said shaft between said end and shoulder and spaced axially therefrom, an inner tubular member in contact with the outer surface of said bearing shell, an outer tubular member spaced from and concentric with said inner tubular member, a resilient member disposed between and filling the annular space between said tubular members to permit spherical or swivelling movement for the bearing and shaft, a packing ring member disposed adjacent opposite ends of said needle bearing and in the annular space formed between the inner surface of said inner tubular member and the outer surface of said shaft, and tubular lateral distance pieces disposed in said annular space within said inner tubular member having their ends adjacent said packing members in contact therewith to prevent axial movement of said bearings, said distance pieces having peripheral rims adjacent their ends disposed away from said packing members, said peripheral rims extending radially outwardly and overlapping the opposite ends of said resilient member, one of said rims acting as an axial stop against said shoulder, an annular washer on the end of said shaft adjacent the other of said rims to act as an axial stop for the bearing assembly, and means for securing said washer against said other rim.

References Cited in the file of this patent

UNITED STATES PATENTS

| | | | |
|---|---|---|---|
| 2,016,924 | Herrmann | Oct. 8, | 1935 |
| 2,201,477 | Chamberlin | May 21, | 1940 |
| 2,244,197 | Hessler | June 3, | 1941 |
| 2,336,579 | Venditty et al. | Dec. 14, | 1943 |
| 2,467,099 | Smith | Apr. 12, | 1949 |
| 2,477,221 | Von Bolhar | July 26, | 1949 |
| 2,488,848 | Carullo et al. | Nov. 22, | 1949 |
| 2,806,749 | Pearce | Sept. 17, | 1957 |
| 2,837,202 | Baechli | June 3, | 1958 |
| 2,859,071 | Riehl | Nov. 4, | 1958 |
| 2,976,091 | Miller | Mar. 21, | 1961 |